United States Patent
Han et al.

(10) Patent No.: US 12,187,347 B2
(45) Date of Patent: Jan. 7, 2025

(54) FLOOR BODY FOR VEHICLE

(71) Applicants: Hyundai Motor Company, Seoul (KR); Kia Corporation, Seoul (KR)

(72) Inventors: Seung Woo Han, Hwaseong-si (KR); Chang Sup Hwang, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 337 days.

(21) Appl. No.: 17/842,961

(22) Filed: Jun. 17, 2022

(65) Prior Publication Data

US 2023/0056309 A1    Feb. 23, 2023

(30) Foreign Application Priority Data

Aug. 23, 2021    (KR) .......................... 10-2021-0110657

(51) Int. Cl.
  *B62D 25/20*    (2006.01)
  *B62D 21/15*    (2006.01)

(52) U.S. Cl.
  CPC ....... *B62D 25/2036* (2013.01); *B62D 21/155* (2013.01)

(58) Field of Classification Search
  CPC  B62D 25/2036; B62D 21/155; B62D 21/157; B62D 21/15; B62D 25/20
  USPC ...................... 296/204, 209, 193.07, 187.08
  See application file for complete search history.

(56) References Cited

U.S. PATENT DOCUMENTS

| | | | | |
|---|---|---|---|---|
| 4,514,008 | A * | 4/1985 | Watanabe | B62D 25/2036 296/204 |
| 9,969,443 | B2 * | 5/2018 | Nishida | B62D 29/046 |
| 10,286,956 | B2 * | 5/2019 | Keuthage | B62D 21/157 |
| 2005/0194818 | A1 * | 9/2005 | Odaka | B62D 21/157 296/187.12 |
| 2010/0156146 | A1 * | 6/2010 | Matsuyama | B62D 25/20 296/193.07 |
| 2015/0158532 | A1 * | 6/2015 | Ayuzawa | B62D 25/20 296/193.07 |
| 2016/0339970 | A1 * | 11/2016 | Shibutake | B62D 35/005 |
| 2018/0370570 | A1 * | 12/2018 | Ayukawa | B62D 25/2018 |
| 2020/0140016 | A1 * | 5/2020 | Liu | B62D 25/20 |
| 2020/0231221 | A1 * | 7/2020 | Tsukamoto | B62D 21/15 |
| 2020/0361542 | A1 * | 11/2020 | Matsuda | B60K 1/04 |
| 2020/0385056 | A1 * | 12/2020 | Kubota | B62D 25/2027 |
| 2021/0061365 | A1 * | 3/2021 | Ebisumoto | B62D 25/08 |
| 2021/0078638 | A1 * | 3/2021 | Hirota | B62D 25/025 |

FOREIGN PATENT DOCUMENTS

KR    101092792 B1    12/2011

* cited by examiner

*Primary Examiner* — Amy R Weisberg
*Assistant Examiner* — Whitney Nicole Francis
(74) *Attorney, Agent, or Firm* — Slater Matsil, LLP (57) ABSTRACT

An embodiment floor body for a vehicle includes a floor panel including an upper surface and an integrated frame coupled to the upper surface of the floor panel, the integrated frame including a pair of side sill upper portions extending in a front/rear direction of the vehicle to be spaced apart from each other in a right/left direction of the vehicle and a cross member extending in the right/left direction of the vehicle to connect the side sill upper portions on either side, wherein the pair of side sill upper portions and the cross member are integrally molded.

20 Claims, 6 Drawing Sheets

FLOOR BODY FOR VEHICLE

CROSS-REFERENCE TO RELATED APPLICATIONS

This application claims the benefit of Korean Patent Application No. 10-2021-0110657, filed on Aug. 23, 2021, which application is hereby incorporated herein by reference.

TECHNICAL FIELD

The present invention relates to a floor body for a vehicle.

BACKGROUND

In general, a platform constituting a floor body structure of a vehicle is largely divided into a monocoque-type platform and a frame-type platform.

The monocoque-type platform folds the cross-section to realize the shape of the members, thereby integrating all parts. This monocoque-type platform has low rigidity but has the advantage of high impact absorption volume due to crumpling of the front part in a collision.

On the other hand, the frame-type platform has a structure in which members are made in frames to be connected to each other, and an underfloor is mounted thereon. Compared with the monocoque-type platform, this frame-type platform has superior rigidity but has the disadvantage of low shock absorption volume due to low deformation in a collision.

Recently, next-generation vehicles using fuel cells or electricity with a frame-type platform are being developed, posing a concern over a problem of crash performance as described above.

The matters described above as the technical background are intended only for a better understanding of the background of the present disclosure and should not be taken as an acknowledgment that they pertain to the conventional art already known to those skilled in the art.

SUMMARY

The present invention relates to a floor body for a vehicle. Particular embodiments relate to technology for integrally manufacturing a side sill upper portion and a cross member.

Embodiments of the present invention can address issues in the art, and an embodiment of the present invention provides technology for improving the rigidity in a side collision and reducing manufacturing costs by integrally manufacturing a side sill upper portion and a cross member and installing a floor panel and a side sill lower portion thereto.

A floor body for a vehicle according to embodiments of the present invention includes an integrated frame which includes a pair of side sill upper portions extending in the front/rear direction of the vehicle to be spaced apart from each other in the right/left direction of the vehicle and a cross member extending in the right/left direction of the vehicle to connect the side sill upper portions on either side and in which the pair of side sill upper portions and a cross member are integrally molded from a single panel, and a floor panel to which the integrated frame is coupled on an upper surface.

A side sill lower portion coupled to a lower portion of the side sill upper portion to form the side sill of the vehicle may be further included.

The side sill lower portion may include a first extension portion extending downward from an outer end, and the first extension portion may form a lower portion of the side sill.

The side sill upper portion may include a second extension portion extending upward at a side end, and the second extension portion may form a top portion of the side sill of the vehicle.

The floor panel may be coupled to the integrated frame along the edge in contact with the lower surface of the integrated frame.

A plurality of cross members may be disposed to be spaced from each other in the front/rear direction of the vehicle and connect the side sill upper portions.

The floor panel may be coupled to the integrated frame along the edge in contact with the lower surface of the integrated frame and may be coupled while forming a closed cross-sectional surface along the side surfaces of the plurality of cross members and the side sill upper portion.

A first bent portion bent downward is formed in the middle of the side sill upper portion and a second bent portion bent outward from the vehicle is formed in the upper end portion of the side sill lower portion to correspond to the first bent portion such that the first bent portion and the second bent portion may be coupled to each other through surface contact.

The floor panel may include a third extension portion extending downward from the side end, the side surface of the third extension portion may be coupled to the side surface of the second bent portion through surface contact, and the upper surface of the floor panel may be coupled to the lower surface of the main frame through surface contact.

The side sill upper portion may include a protrusion portion protruding toward the inside of the vehicle and having the width decreasing in the protruding direction, and the cross member may extend from the protrusion portion.

The cross member may include an uneven portion protruding upward and extending in the right/left direction of the vehicle.

A sub-member extending in the front/rear direction of the vehicle to be coupled to the cross member or the top of the floor panel may be further included.

The sub-member may include a first sub-member extending in the front/rear direction of the vehicle to cross the cross member and be connected to the cross member and the floor panel.

The sub-member may include a second sub-member extending in the front/rear direction of the vehicle to be disposed over the floor panel and connected to the cross member at an end.

The floor body for the vehicle according to embodiments of the present invention is provided with an integrated frame in which the cross member and the side sill upper portion are integrally formed so that the rigidity of the connecting parts of the cross member and the side sill upper portion in a side collision may be improved.

In addition, a trapezoidal protrusion portion protruding from the side sill upper portion toward the inside of the vehicle is formed and the cross member extends to connect the protrusion portions so that load pass is formed and a protection range of the side sill against the impact in a side collision is expanded. This has the effect of safely protecting a battery or passenger inside the vehicle.

In addition, the floor panel is welded to the lower portion of the integrated frame through surface contact, and the side sill lower portion is coupled to the third extension portion of the floor panel and the side sill upper portion by welding so that the coupling rigidity of the floor body for the vehicle may be improved.

DETAILED DESCRIPTION OF ILLUSTRATIVE EMBODIMENTS

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the embodiments of the present invention may be modified in various ways and have various forms, specific embodiments will be illustrated in the drawings and described in the present specification or application. However, this is not intended to limit the embodiments according to the concept of the present invention to the specific forms and embodiments of the present invention should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there are no intervening components present. Other expressions describing the relationship between components such as "between" and "just between" or "adjacent to" and "directly adjacent to" should be interpreted in the same manner.

The terms used herein are used for the purpose of describing particular embodiments only and are not intended to limit the invention. Singular expressions include plural expressions unless the context explicitly indicates otherwise. In the present specification, terms such as "comprise" or "have" are intended to designate the presence of implemented features, numbers, steps, operations, components, parts, or combinations thereof and should not be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which the present invention pertains. It will be further understood that terms, such as those defined in commonly used dictionaries, should be interpreted as having a meaning that is consistent with their meaning in the context of the present specification, and will not be interpreted in an idealized or overly formal sense unless expressly so defined herein.

In the following, features of the present invention will be described in detail by describing preferred embodiments of the present invention with reference to the accompanying drawings. The same reference numerals shown in each drawing indicate the same members.

Figure 1:
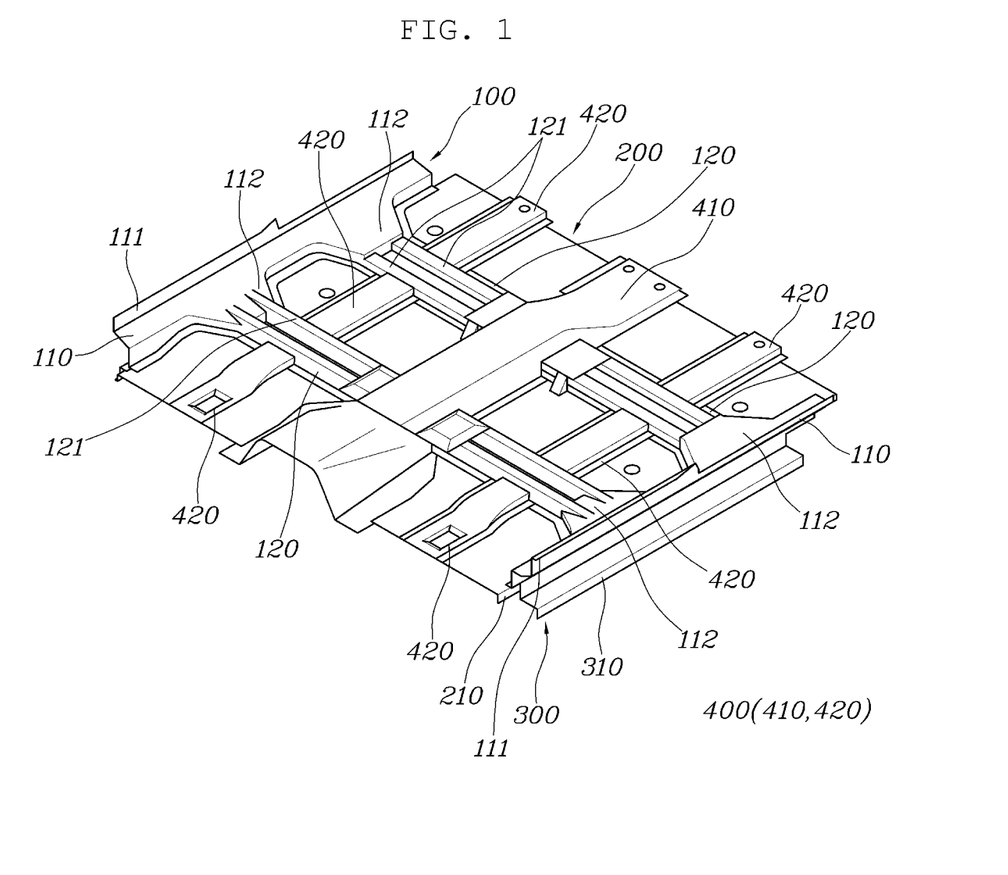
FIG. 1 is a perspective view showing a floor body for a vehicle according to an embodiment of the present invention.
Figure 2:
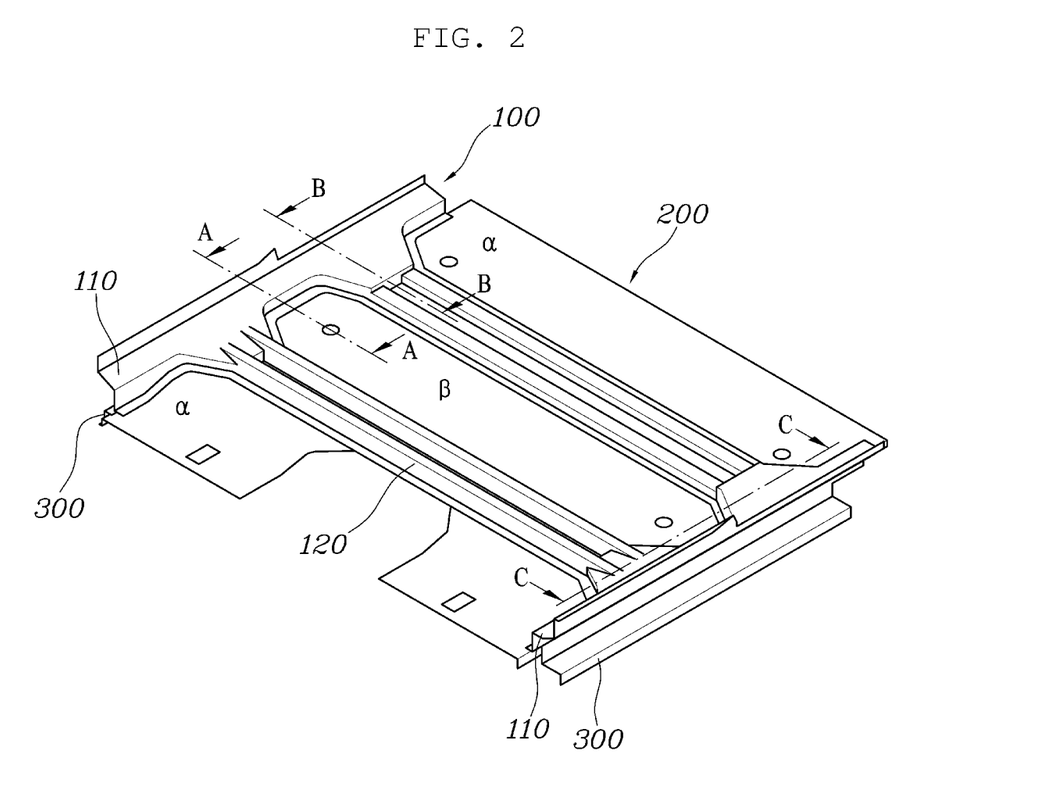
FIG. 2 is a perspective view showing an integrated frame included in a floor body for a vehicle and a floor panel coupled to each other according to an embodiment of the present invention.
Figure 3:
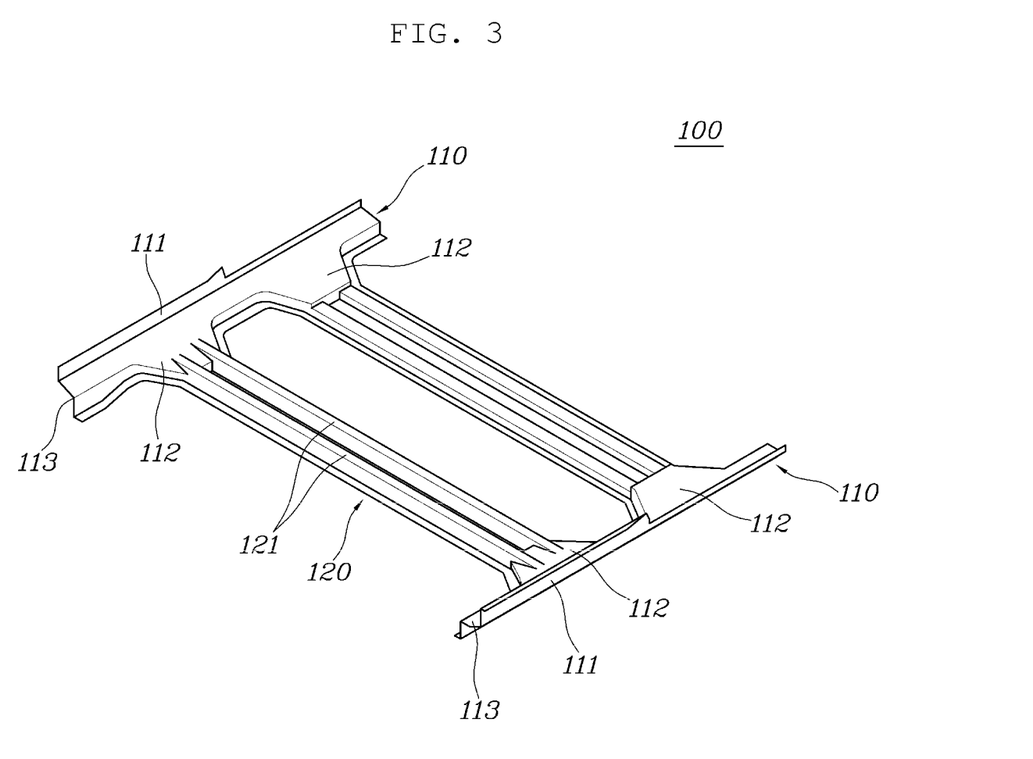
FIG. 3 is a perspective view showing an integrated frame included in a floor body for a vehicle according to an embodiment of the present invention.
Figure 4:
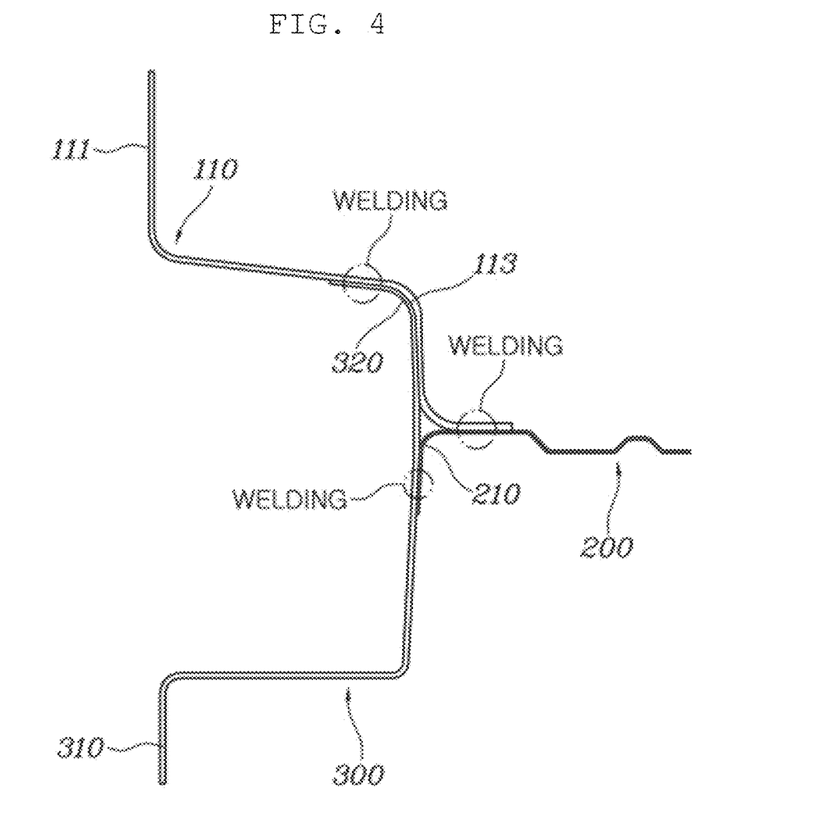
FIG. 4 is a view showing an integrated frame included in a floor body for a vehicle taken along the line A-A in FIG. 2.
Figure 5:
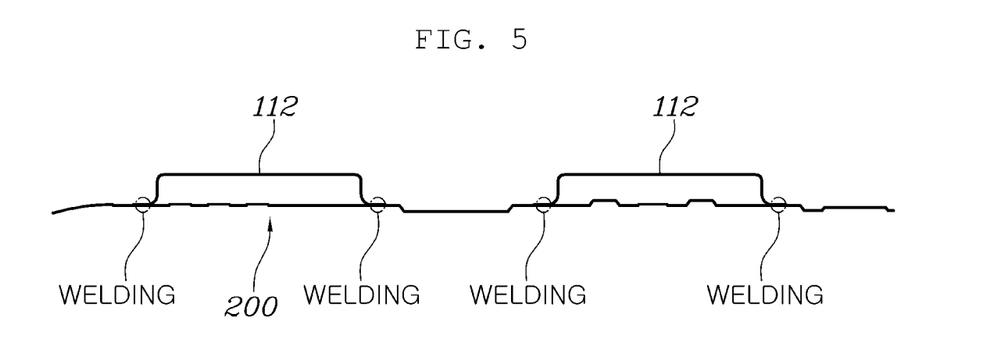
FIG. 5 is a view showing an integrated frame included in a floor body for a vehicle taken along the line B-B in FIG. 2.
Figure 6:
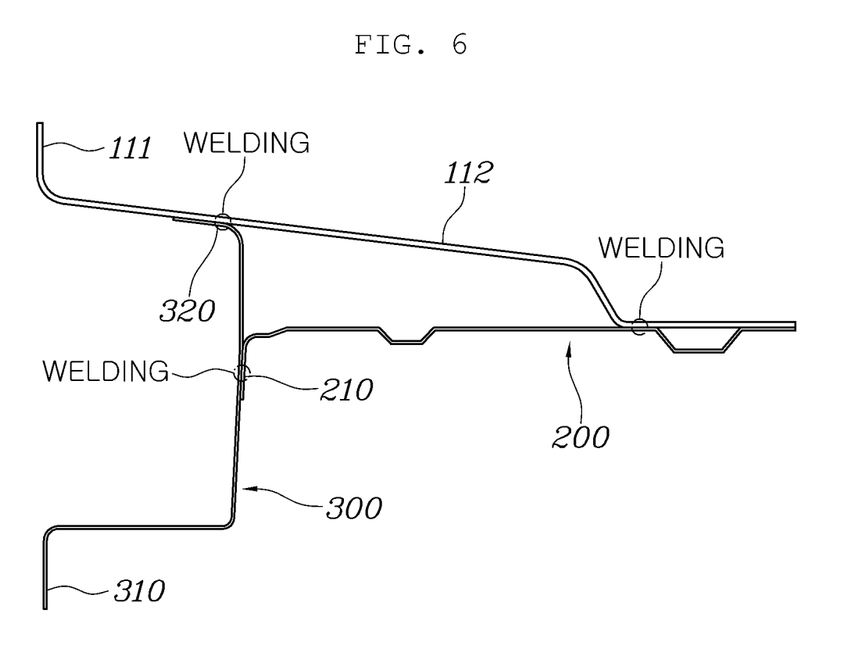
FIG. 6 is a view showing an integrated frame included in a floor body for a vehicle taken along the line C-C in FIG. 2.

FIG. 1 is a perspective view showing a floor body for a vehicle according to an embodiment of the present invention, FIG. 2 is a perspective view showing an integrated frame 100, included in a floor body for a vehicle, and a floor panel 200 coupled to each other according to an embodiment of the present invention, FIG. 3 is a perspective view showing an integrated frame 100 included in a floor body for a vehicle according to an embodiment of the present invention, FIG. 4 is a view showing an integrated frame included in a floor body for a vehicle taken along the line A-A in FIG. 2, FIG. 5 is a view showing an integrated frame included in a floor body for a vehicle taken along the line B-B in FIG. 2, and FIG. 6 is a view showing an integrated frame included in a floor body for a vehicle taken along the line C-C in FIG. 2.

The floor body for a conventional vehicle may include a pair of side sills supporting the sides of the vehicle and extending in the front/rear direction of the vehicle, a cross member connecting the pair of side sills, and a floor panel mounted under the cross member and the side sills.

As described above, a plurality of members are respectively coupled to the floor body for the conventional vehicle such that damages to the coupling parts may lead to injuries to passengers when the vehicle collides.

To address issues in the art, embodiments of the present invention may improve the floor body rigidity by integrally molding the side sill and the cross member.

Specifically, the floor body for the vehicle according to embodiments of the present invention includes an integrated frame 100 which includes a pair of side sill upper portions 110 extending in the front/rear direction of the vehicle to be spaced apart from each other in the right/left direction of the vehicle and a cross member 120 extending in the right/left direction of the vehicle to connect the side sill upper portions 110 on either side, in which the pair of side sill upper portions 110 and the cross member 120 are integrally molded from a single panel, and a floor panel 200 to which the integrated frame 100 is coupled on an upper surface thereof.

As shown in FIGS. 1 to 3, a single panel may be formed into the pair of side sill upper portions 110 positioned on either lower side of the vehicle to extend in the front/rear direction of the vehicle and the cross member 120 connecting the pair of side sill upper portions 110 such that the pair of side sill upper portions 110 and the cross member 120 may be integrally formed into the integrated frame 100 by press molding.

This allows integral formation of the side sill upper portion 110 and the cross member 120 to improve rigidity and reduction of the volume of impact in a side collision of the vehicle by transmitting the impact received by the floor body for the vehicle to the integrated frame 100, thereby having the effect of separating the side sill upper portion 110 and the cross member 120.

In addition, integrally press molding a panel into the side sill upper portion 110 and the cross member 120 has the effect of simplifying the manufacturing process and reducing cost.

The floor panel 200 may be coupled to the lower portion of the integrated frame 100 to form a floor of the vehicle. A battery may be mounted under the floor panel 200 in the case of an electric vehicle, and a fuel tank or the like may be mounted in the case of an internal combustion engine vehicle.

A side sill lower portion 300 coupled to a lower portion of the side sill upper portion 110 to form the side sill may be further included.

A conventional side sill may be formed to have a large and predetermined area to protect passengers and the vehicle body from external obstacles that collide with the vehicle from outside the vehicle. The side sill upper portion 110 included in the integrated frame 100 is manufactured by press molding a panel so that the range of the lower side of the vehicle that can be protected becomes limited. To compensate for this insufficiency, the side sill lower portion 300 manufactured by press molding is coupled to the lower portion of the side sill upper portion no to form the side sill of the vehicle.

This has the effect of protecting the lower side of the vehicle by the side sill lower portion 300 and the side sill upper portion no. In addition, easy processing of the side sill lower portion 300 by press molding as compared with extrusion molding has the effect of reducing cost.

The side sill lower portion 300 may include a first extension portion 310 extending downward from the outer end, and the first extension portion 310 may form a lower portion of the side sill.

The first extension portion 310 may bend downward from the outer end of the side sill lower portion 300 and extend downward to form a lower side of the side sill of the vehicle.

The first extension portion 310 may be formed in a flange structure extending downward to mount an exterior of the vehicle such as a side skirt or an outer plate on the first extension portion 310 and expand a protection range of the lower side of the vehicle in the up/down direction at the same time.

The side sill upper portion no may include a second extension portion 111 extending upward at a side end, and the second extension portion 111 may form a top portion of the side sill of the vehicle.

The second extension portion 111 may bend upward from the outer end of the side sill upper portion no and extend upward to form an upper side of the side sill of the vehicle.

The first extension portion 310 may be formed in a flange structure extending downward to mount an exterior of the vehicle such as a side skirt or an outer plate on the first extension portion 310 and expand a protection range of the lower side of the vehicle in the up/down direction at the same time.

The floor panel 200 may be coupled to the integrated frame 100 along the edge in contact with the lower surface of the integrated frame 100.

As shown in FIG. 2, the floor panel 200 under the integrated frame 100 may bend and extend in the same direction as the extending plane and the lower end portion of the integrated frame 100 may be in contact with the upper surface of the floor panel 200 to be coupled to each other. At this time, the integrated frame 100 and the floor panel 200 may be coupled to each other by welding coupling or mechanical coupling such as bolting or riveting.

Coupling of the floor panel 200 to the cross member 120 and the side sill upper portion no of the integrated frame 100 through connection to the edges thereof improves the bond force between the floor panel 200 and the integrated frame 100. This has the effect of safely protecting the passengers in the side collision by simultaneously absorbing the impact by the floor panel 200 and the integrated frame 100.

A plurality of cross members 120 may be disposed to be spaced apart from each other in the front/rear direction of the vehicle to connect the side sill upper portions no.

As shown in FIGS. 2 and 3, a plurality of cross members may be disposed to be spaced apart from each other in the front/rear direction of the vehicle to connect the side sill upper portions no.

This may improve rigidity supporting the side sill upper portion no, and more cross members may be added depending on the length of vehicle or the type of vehicle.

The present embodiment illustrates two cross members 120, but the cross member 120 may be added when the length of the vehicle increases, and the length of the cross member 120 may be extended when the width of the vehicle increases.

The floor panel 200 may be coupled to the integrated frame 100 along the edge in contact with the lower side of the integrated frame 100 and may be coupled while forming a closed cross-sectional surface along the side surfaces of a plurality of cross members 120 and the side sill upper portion no.

As shown in FIG. 2, a plurality of cross members 120 may be formed, and the floor panel 200 may be coupled along the edges of a plurality of cross members 120 and the side sill upper portion no such that the coupling portions may be formed in a closed cross-sectional shape.

Coupling of the floor panel 200 and the integrated frame 100 in a closed cross-sectional shape improves the bonding force, thereby having the effect of improving the rigidity against a side collision.

A first bent portion 113 bent downward is formed in the middle of the side sill upper portion no and a second bent portion 320 bent outward from the vehicle is formed in the upper end portion of the side sill lower portion 300 to correspond to the first bent portion 113 such that the first bent portion 113 and the second bent portion 320 may be coupled to each other through surface contact.

As shown in FIG. 4, the first bent portion 113 bent downward may be formed in the middle of the side sill upper portion 110 and the second bent portion 320 bent outward from the vehicle is formed in the upper end portion of the side sill lower portion 300. The second bent portion 320 may be formed to correspond to the first bent portion 113, and the upper surface of the second bent portion 320 is in contact with the lower surface of the first bent portion 113 to be coupled by welding.

This allows expansion of the range of the side lower portion of the vehicle protected from an external impact through the integral coupling of the side sill upper portion no and the side sill lower portion 300, thereby having the effect of improving bonding rigidity through surface contact.

The floor panel 200 may include a third extension portion 210 extending downward from the side end, the side surface of the third extension portion 210 may be coupled to the side surface of the second bent portion 320 through surface contact, and the upper surface of the floor panel 200 may be coupled to the lower surface of the integrated frame 100 through surface contact.

As shown in FIGS. 4 to 6, the floor panel 200 may bend downward to form the extending third extension portion 210 at the side end, and the third extension portion 210 may be coupled to the side surface of the side sill lower portion 300 through surface contact by welding coupling or mechanical coupling such as bolting or riveting.

This allows coupling of the upper surface of the floor panel 200 to the integrated frame 100 and coupling of the third extension portion 210 to the side sill lower portion 300, thereby having the effect of improving bonding rigidity of the integrated frame 100, the floor panel 200, and the side sill lower portion 300.

The side sill upper portion no may include a protrusion portion 112 protruding toward the inside of the vehicle and having the width decreasing in the protruding direction, and the cross member 120 may extend from the protrusion portion 112.

As shown in FIG. 3, the protrusion portion 112 protruding toward the inside of the vehicle may be formed in the side sill upper portion 110, and the cross member 120 may extend to connect the ends of the protrusion portions 112 to each other. The protrusion portion 112 may be formed in a trapezoidal shape having the width decreasing toward the inside of the vehicle in the side sill upper portion 110.

This allows the formation of the load pass toward the cross member 120 through the trapezoidal protrusion 112 and expansion of the protection range of the side sill against impact by transmitting the collision with the side sill upper portion no to the cross member 120, thereby having the effect of protecting passengers inside or a battery mounted on the floor panel 200.

The cross member 120 may include an uneven portion 121 protruding upward to extend in the right/left direction of the vehicle.

As shown in FIG. 3, the uneven portion 121 may be formed to protrude upward from the upper portion of the cross member 120, and a plurality of uneven portions 121 may be formed from the upper portion of the cross member 120 to be spaced apart from each other in the front/rear direction of the vehicle.

This has the effect of improving the rigidity of the cross member 120 by the uneven portion 121 or the effect of improving handiness in mounting seats or interior parts of the vehicle to be coupled to the upper portion of the cross member 120.

A sub-member 400 extending in the front/rear direction of the vehicle to be coupled to the cross member 120 or the upper portion of the floor panel 200 may be further included.

The sub-member 400 may be additionally coupled to the floor panel 200 or the integrated frame 100 to improve rigidity at the center of the vehicle after the floor panel 200 is coupled to the integrated frame 100.

The sub-member 400 may extend in the front/rear direction of the vehicle to be coupled to the floor panel 200, and the end thereof may be coupled to the cross member 120 or pass over the cross member 120 to be simultaneously coupled to the floor panel 200 and the cross member 120 while crossing the cross member 120.

This has the effect of improving the rigidity in the front/rear direction of the vehicle.

The sub-member 400 may include a first sub-member 410 extending in the front/rear direction of the vehicle to cross the cross member 120 to be connected to the cross member 120 and the floor panel 200.

As shown in FIG. 1, the first sub-member 410 may be coupled to the center of the floor panel 200 to cross the cross member 120 over the integrated frame 100 and the floor panel 200 in a state where the first sub-member 410 extends in the front/rear direction of the vehicle to be coupled to the integrated frame wo and the floor panel 200.

This may improve rigidity of the center portion of the vehicle and protect a power transmission shaft when the power transmission shaft is disposed at the center of the vehicle.

The sub-member 400 may include a second sub-member 420 extending in the front/rear direction of the vehicle to be disposed over the floor panel 200 and connected to the cross member 120 at the end.

As shown in FIG. 1, the second sub-member 420 is coupled to the upper portion of the floor panel 200 and connected to the cross member 120 at the end, thereby improving the rigidity of the cross member 120 in the front/rear direction of the vehicle.

In addition, the second sub-member 420 is coupled to the plurality of cross members 120 to connect the cross members 120 in the front/rear direction of the vehicle, thereby supporting the torsional rigidity of the cross member 120.

Specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A floor body for a vehicle, the floor body comprising:
   a floor panel comprising an upper surface; and
   an integrated frame coupled to the upper surface of the floor panel, the integrated frame comprising:
      a pair of side sill upper portions extending in a front/rear direction of the vehicle to be spaced apart from each other in a right/left direction of the vehicle; and
      a cross member extending in the right/left direction of the vehicle to connect the side sill upper portions on either side, wherein the pair of side sill upper portions and the cross member are integrally molded;
   wherein each of the side sill upper portions includes a protrusion portion protruding toward an inside of the vehicle and having a decreasing width in the protruding direction; and
   wherein the cross member extends from the protrusion portions.

2. The floor body according to claim 1, further comprising a side sill lower portion coupled to a lower portion of a respective side sill upper portion of the pair of side sill upper portions to define a side sill.

3. The floor body according to claim 2, wherein the side sill lower portion includes a first extension portion extending downward from an outer end, and wherein the first extension portion defines a lower portion of the side sill.

4. The floor body according to claim 2, wherein a first bent portion bent downward is provided in a middle region of the side sill upper portion and a second bent portion bent outward from the vehicle is provided in an upper end portion of the side sill lower portion to correspond to the first bent portion such that the first bent portion and the second bent portion are coupled to each other through surface contact.

5. The floor body according to claim 4, wherein the floor panel comprises a third extension portion extending downward at a side end, a side surface of the third extension portion is coupled to a side surface of the second bent portion through surface contact, and an upper surface of the floor panel is coupled to a lower surface of the integrated frame through surface contact.

6. The floor body according to claim 1, wherein the side sill upper portion includes a second extension portion extending upward at a side end, and wherein the second extension portion defines a top portion of the side sill.

7. The floor body according to claim 1, wherein the floor panel is coupled to the integrated frame along an edge in contact with a lower surface of the integrated frame.

8. The floor body according to claim 1, further comprising a plurality of cross members, wherein the cross members are spaced apart from each other in the front/rear direction of the vehicle to connect the side sill upper portions.

9. The floor body according to claim 8, wherein the floor panel is coupled to the integrated frame along an edge in contact with a lower surface of the integrated frame and is coupled while forming a closed cross-sectional surface alongside surfaces of the cross members and the side sill upper portions.

10. The floor body according to claim 1, wherein the cross member comprises an uneven portion protruding upward to extend in the right/left direction of the vehicle.

11. A floor body for a vehicle, the floor body comprising:
a floor panel comprising an upper surface;
an integrated frame coupled to the upper surface of the floor panel, the integrated frame comprising:
 a pair of side sill upper portions extending in a front/rear direction of the vehicle to be spaced apart from each other in a right/left direction of the vehicle; and
 a cross member extending in the right/left direction of the vehicle to connect the side sill upper portions on either side, wherein the pair of side sill upper portions and the cross member are integrally molded; and
a sub-member extending in the front/rear direction of the vehicle and coupled to the cross member or the upper surface of the floor panel;
wherein each of the side sill upper portions includes a protrusion portion protruding toward an inside of the vehicle and having a decreasing width in the protruding direction; and
wherein the cross member extends from the protrusion portions.

12. The floor body according to claim 11, wherein the sub-member comprises a first sub-member extending in the front/rear direction of the vehicle to cross the cross member and be connected to the cross member and the floor panel.

13. The floor body according to claim 11, wherein the sub-member comprises a second sub-member extending in the front/rear direction of the vehicle, the second sub-member being disposed over the floor panel and connected to the cross member at an end.

14. A vehicle comprising:
a vehicle body;
a floor panel coupled to the vehicle body;
a power source mounted under the floor panel; and
an integrated frame coupled to an upper surface of the floor panel, the integrated frame comprising:
 a pair of side sill upper portions extending in a front/rear direction of the vehicle to be spaced apart from each other in a right/left direction of the vehicle; and
 a cross member extending in the right/left direction of the vehicle to connect the side sill upper portions on either side, wherein the pair of side sill upper portions and the cross member are integrally molded;
wherein each of the side sill upper portions includes a protrusion portion protruding toward an inside of the vehicle and having a decreasing width in the protruding direction; and
wherein the cross member extends from the protrusion portions.

15. The vehicle according to claim 14, further comprising a side sill lower portion coupled to a lower portion of a respective side sill upper portion of the pair of side sill upper portions to define a side sill.

16. The vehicle according to claim 15, wherein the side sill lower portion includes a first extension portion extending downward from an outer end, and wherein the first extension portion defines a lower portion of the side sill.

17. The vehicle according to claim 15, wherein:
a first bent portion bent downward is provided in a middle region of the side sill upper portion;
a second bent portion bent outward from the vehicle is provided in an upper end portion of the side sill lower portion to correspond to the first bent portion such that the first bent portion and the second bent portion are coupled to each other through surface contact;
the floor panel comprises a third extension portion extending downward at a side end;
a side surface of the third extension portion is coupled to a side surface of the second bent portion through surface contact; and
an upper surface of the floor panel is coupled to a lower surface of the integrated frame through surface contact.

18. The vehicle according to claim 14, wherein the side sill upper portion includes a second extension portion extending upward at a side end, and wherein the second extension portion defines a top portion of the side sill.

19. The vehicle according to claim 14, wherein the floor panel is coupled to the integrated frame along an edge in contact with a lower surface of the integrated frame.

20. The floor body according to claim 11, further comprising a side sill lower portion coupled to a lower portion of a respective side sill upper portion of the pair of side sill upper portions to define a side sill, wherein a first bent portion bent downward is provided in a middle region of the side sill upper portion and a second bent portion bent outward from the vehicle is provided in an upper end portion of the side sill lower portion to correspond to the first bent portion such that the first bent portion and the second bent portion are coupled to each other through surface contact.

* * * * *